United States Patent [19]

Byrns

[11] 4,369,516
[45] Jan. 18, 1983

[54] SELF-CLOCKING DATA TRANSMISSION SYSTEM

[75] Inventor: John P. Byrns, Hoffman Estates, Ill.

[73] Assignee: Motorola, Inc., Schaumburg, Ill.

[21] Appl. No.: 187,303

[22] Filed: Sep. 15, 1980

[51] Int. Cl.³ ............................................. H03K 5/156
[52] U.S. Cl. ..................................... 375/110; 375/38; 371/68; 371/70; 360/40; 360/48
[58] Field of Search ................. 375/38, 110; 370/85, 370/91, 100; 371/68–70; 360/39, 40, 48, 49; 455/608; 364/900 MS File

[56] References Cited

U.S. PATENT DOCUMENTS

| | | | |
|---|---|---|---|
| 3,634,855 | 1/1972 | Miller | 375/20 |
| 3,702,379 | 11/1972 | Peterson et al. | 370/98 |
| 3,863,025 | 1/1975 | Gonsewski | 375/55 |
| 3,961,367 | 6/1976 | Wu | 360/44 |
| 3,978,319 | 8/1976 | Vinal | 250/555 |
| 4,085,448 | 7/1978 | Kogge | 364/900 |
| 4,101,969 | 4/1978 | Lawson et al. | 364/900 |
| 4,280,221 | 7/1981 | Chun et al. | 375/17 |

Primary Examiner—Benedict V. Safourek
Assistant Examiner—Stephen Chin
Attorney, Agent, or Firm—Rollie Hackbart; James W. Gillman

[57] ABSTRACT

A data transmission system is described where data signals are bidirectionally transmitted between a data transmitter and a plurality of data receivers in a self-clocking bit streams carried on true data and complement data signal lines and a non-return-to-zero (NRZ) bit streams on a return data signal line. According to an inventive data transmission scheme, data signals are transmitted by the data transmitter by utilizing the four possible two-bit binary states of the true data and complement data signal lines. Of the four two-bit binary states, a word state is provided before and after the data signal and a one state or zero state followed by a bit state is provided for each bit of the data signal. The data receivers detect the bit state to recover a bit clock signal and detect the one state and zero state to recover an NRZ data signal. In response to the bit clock signal, the NRZ data signal is serially shifted into a register while a previously parallel loaded return data signal is shifted out of the register and applied to the return data signal line. The inventive data transmission scheme is self-clocking and highly immune to speed and timing variations in the transmission. The inventive data transmission may be advantageously utilized for data transmission in many different data transmission systems, such as computer systems for data transmission between a microprocessor and peripheral units and control systems for data transmission between a central control station and geographically remote stations.

21 Claims, 7 Drawing Figures

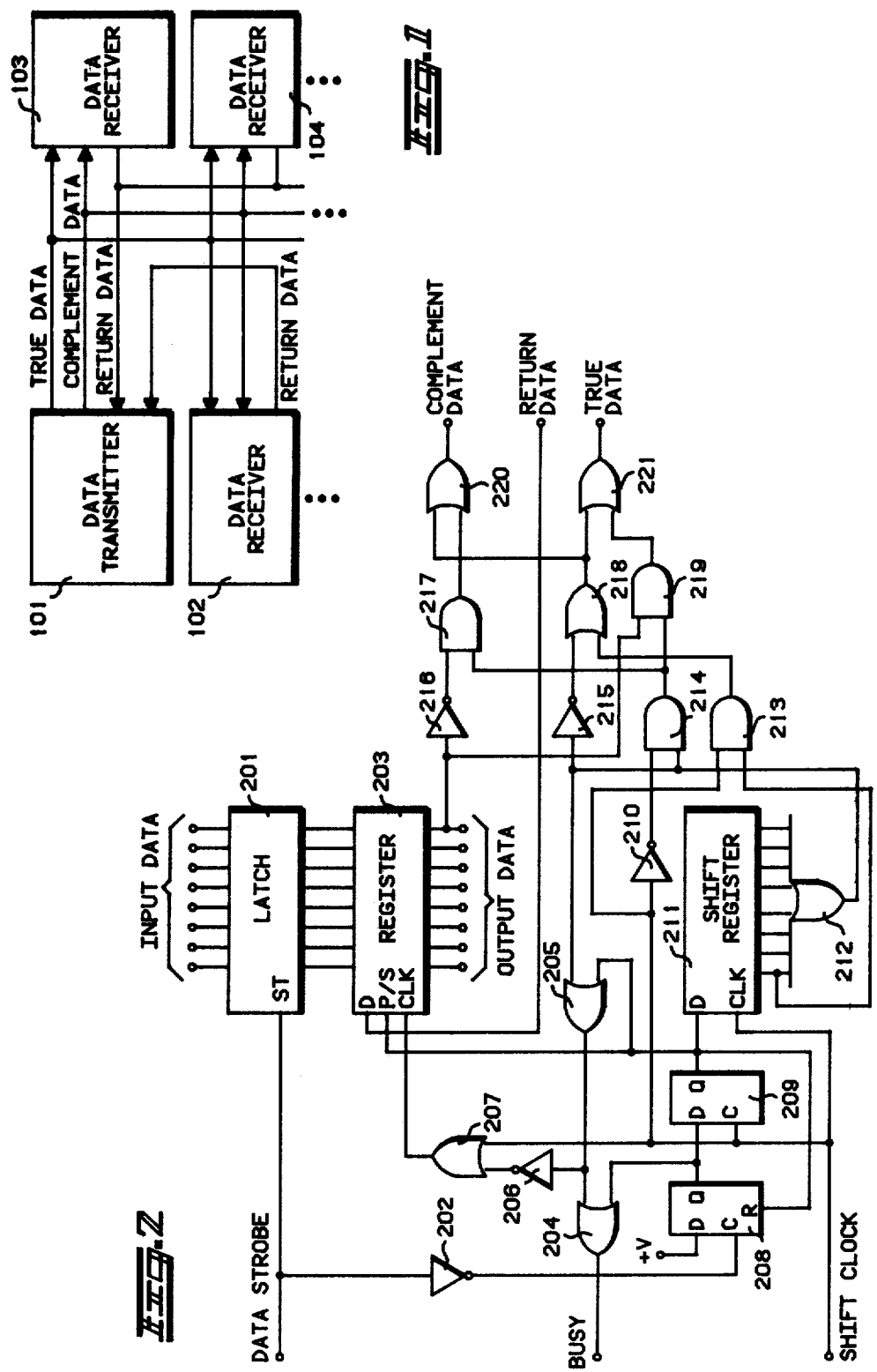

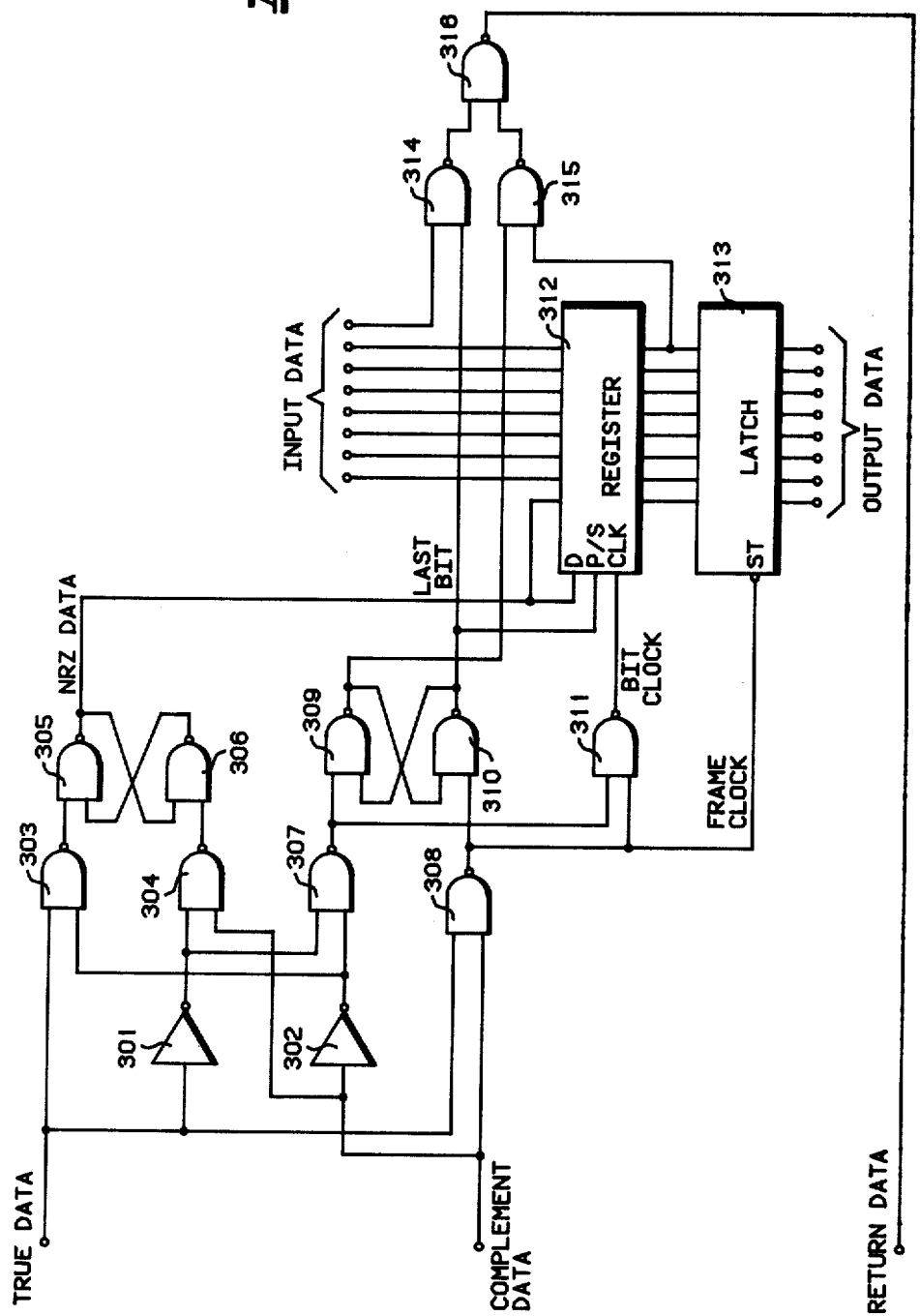

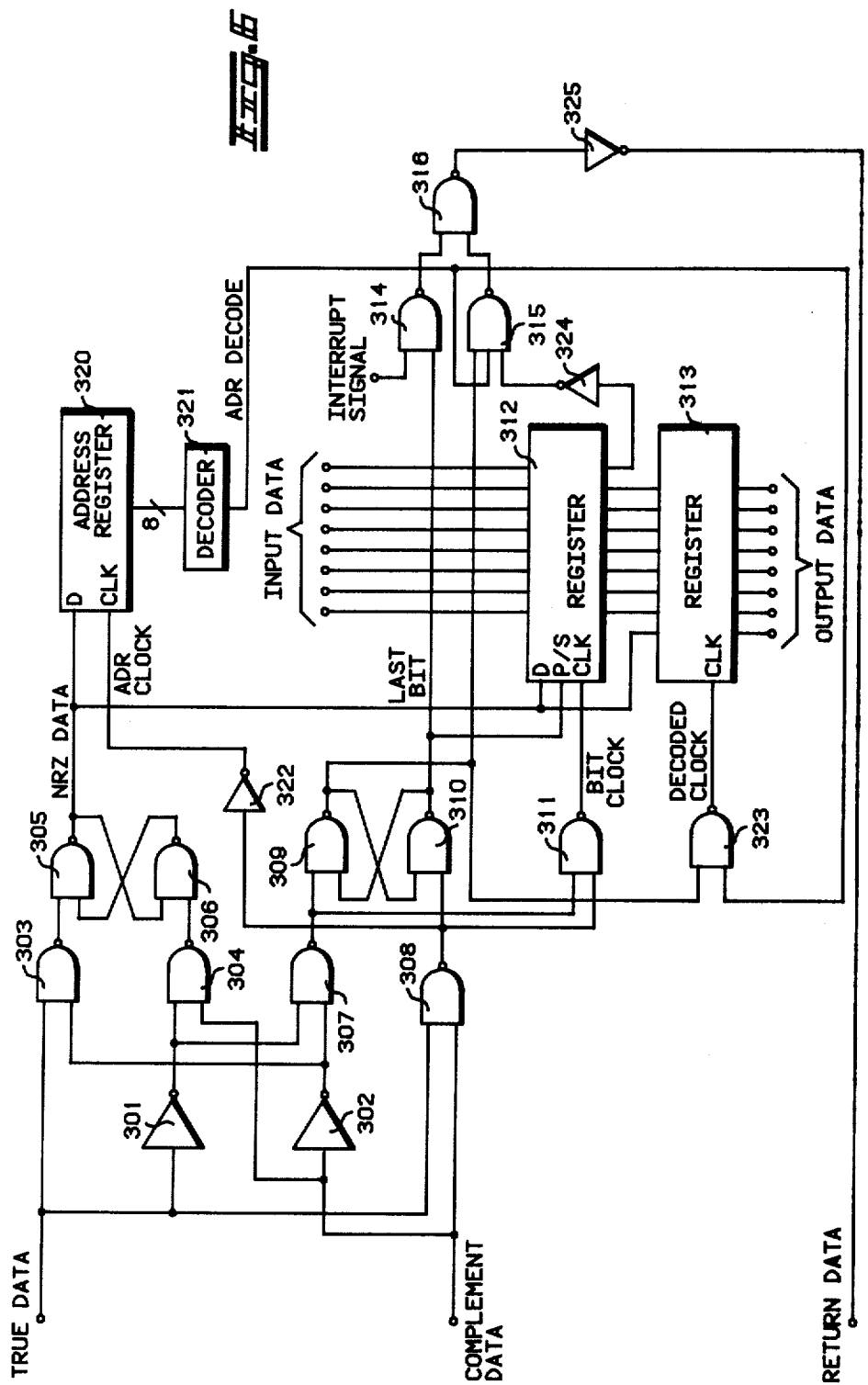

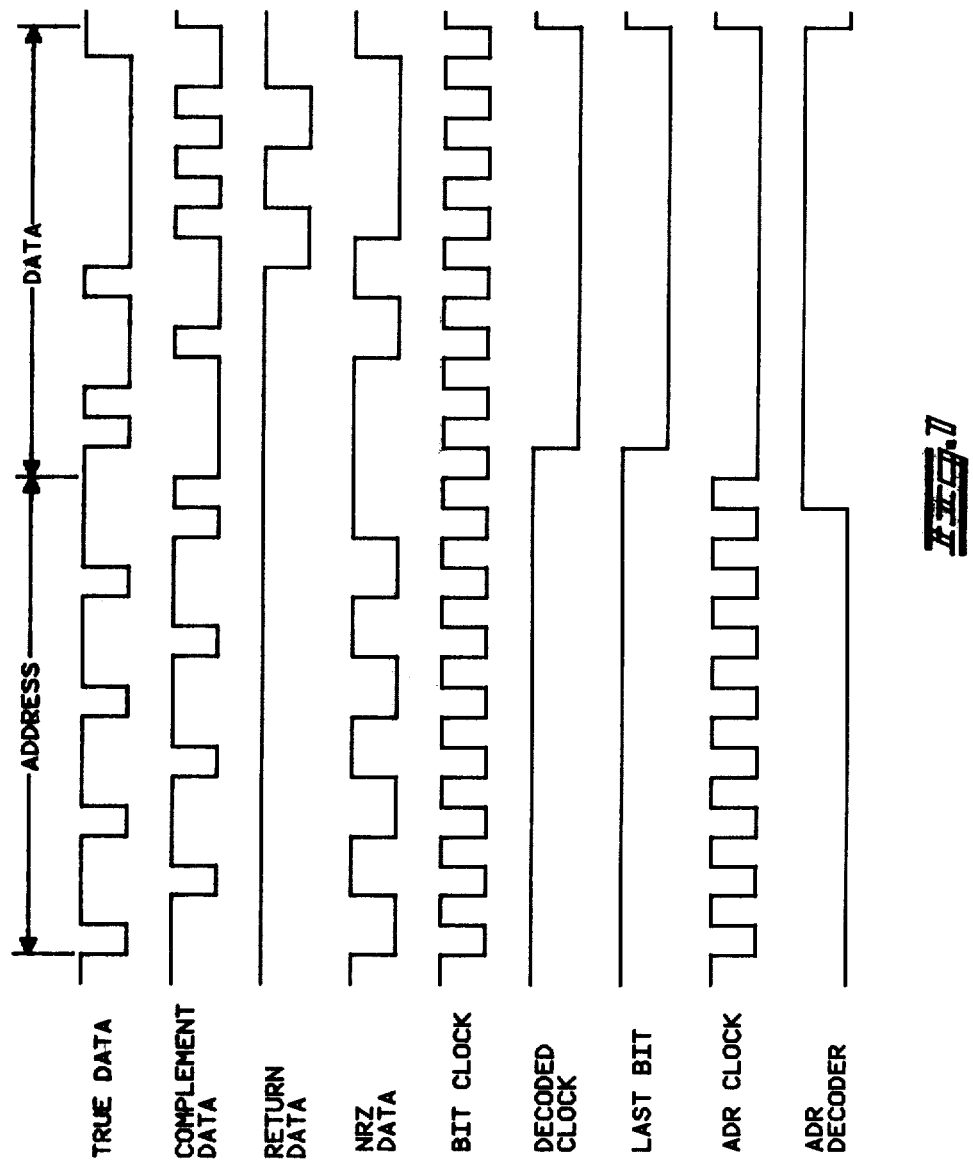

SELF-CLOCKING DATA TRANSMISSION SYSTEM

RELATED PATENT APPLICATIONS

The instant application is related to the following patent applications filed the same date as and assigned to the same assignee as the instant application: Ser. No. 187,306, by Larry C. Puhl et al., entitled "Interface Adapter Architecture"; Ser. No. 187,302, by Larry C. Puhl et al., entitled "Communications Microprocessor Architecture"; Ser. No. 187,305, by Larry C. Puhl et al, entitled "Keyboard and Display Interface Adapter Architecture"; and Ser. No. 187,304, by Larry C. Puhl et al., entitled "Microprocessor Controlled Radiotelephone Transceiver". The instant application is also related to U.S. Pat. No. 4,312,074, by Kenneth A. Felix and James A. Pautler, entitled "Improved Method and Apparatus for Detecting a Data Signal Including Repeated Data Words", and U.S. Pat. No. 4,302,845 by John P. Byrns and Michael J. McClaughry, entitled "Phase-Encoded Data Signal Demodulator", both of which were filed on Feb. 7, 1980, and are assigned to the instant assignee. By reference thereto, the foregoing related patent applications are incorporated in their entirety into the instant application.

BACKGROUND OF THE INVENTION

The present invention relates generally to data transmission systems, and more particularly to an improved method and apparatus for the self-clocking transmission of digital data signals.

Among the self-clocking data transmission techniques in the prior art, one technique commonly referred to as "polar return to zero" utilizes different voltage levels within a bit interval to encode a data signal. For example, a positive voltage level with respect to a reference voltage level indicates a binary one state, while a negative voltage level with respect to the reference voltage level indicates a binary zero state. Another technique commonly referred to as Manchester coding provides a transition during each bit interval, where the direction of the transition determines the binary state of the bit. For example, a positive transition during a bit interval may represent a binary one bit, while a negative transition may represent a binary zero bit.

However, in order to properly receive data signals transmitted according to these prior art techniques, it is essential that timing relationships between successive bits of the data signal be accurately maintained at the data transmitter and properly recognized at the data receiver. Furthermore, proper reception at the data receiver is also dependent on recovery of the clock signal and precise definition of the bit interval. Thus, transmission systems utilizing these prior art techniques are very sensitive to speed and timing variations in the transmission of the data signals, and require that receiving apparatus include expensive and complex circuitry to compensate for such variations.

SUMMARY OF THE INVENTION

Accordingly, it is an object of the present invention to provide an improved method and apparatus for self-clocking data transmission systems that accommodates expansive variations in the speed and timing of the transmission.

It is another object of the present invention to provide an improved self-clocking data transmission system for providing bidirectional data transmission between a data transmitter and a plurality of data receivers.

It is a further object of the present invention to provide an improved self-clocking data transmission system for providing data transmission between a data transmitter and a plurality of separately addressable data receivers.

It is a further object of the present invention to provide an improved self-clocking data transmission system for providing data transmission between a data transmitter and a plurality of data receivers each of which may request a data transmission from the transmitter.

In practicing the present invention, data signals having a plurality of binary bits are transmitted on two signal lines between a data transmitter and one or more data receivers of a self-clocking data transmission system. Data signals are transmitted on the two signal lines by utilizing the four possible two-bit binary states of the two signal lines taken together. According to the data transmission scheme of the present invention, a first two-bit binary state of the signal lines is provided both before and after the data signal, and for each bit of the data signal a second two-bit binary state of the signal lines followed by a third two-bit binary state of the signal lines is generated for a bit having a binary one state and a fourth two-bit binary state of the signal lines followed by a third two-bit binary state of the signal lines is generated for a bit having a binary zero state. As a result, the transmitted data signal is not only self-clocking, but also independent of the transmission frequency, thereby accommodating expansive variations in the time duration of successive bit intervals.

In the data transmission system of the present invention, a data transmitter is coupled to one or more data receivers by two signal lines on which data signals are transmitted according to the foregoing data transmission scheme. The data transmitter includes circuitry for generating the two-bit binary states of the signal lines for each bit of a data signal to be transmitted. The receiving units include circuitry responsive to the third two-bit binary state of the signal lines for providing a clock signal. The receiving unit also includes first storing circuitry responsive to the second and fourth two-bit binary states of the signal lines for storing an output signal having a binary one or zero state, respectively. Thus, the output signal of the first storing circuitry reflects the binary state of the successive bits of the transmitted data signal. The output signal of the first storing circuitry is then stored into second storing circuitry in response to the clock signal. At the end of the transmission, the second storing circuitry holds the received data signal. The received data signal in the second storing circuitry may then be utilized for accomplishing any suitable function in the data receiver.

BRIEF DESCRIPTION OF THE DRAWINGS

FIG. 1 is a block diagram of a self-clocking data transmission system embodying the present invention.

FIG. 2 is a block diagram of a data transmitter for the data transmission system in FIG. 1.

FIG. 3 is a block diagram of a data receiver for the data transmission system in FIG. 1.

FIG. 6 is a block diagram of a different data receiver for the data transmission system in FIG. 1.

FIG. 7 is a timing diagram of the waveforms for various blocks of the data receiver in FIG. 6.

DETAILED DESCRIPTION OF THE PREFERRED EMBODIMENT

Figure 4:
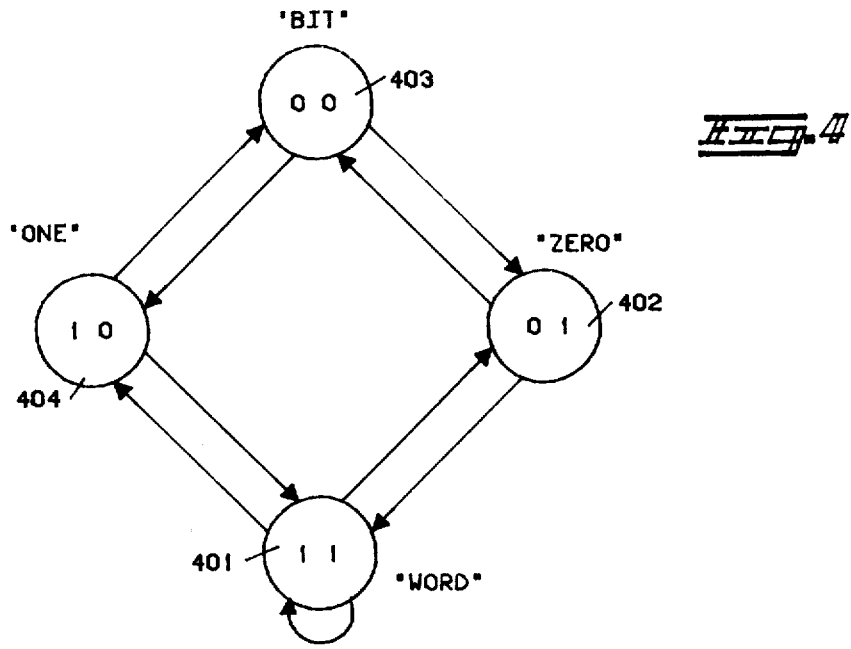
FIG. 4 is a state diagram illustrating the binary states that may be utilized to encode the data signals transmit

In FIG. 1, there is illustrated a block diagram of a self-clocking data transmission system embodying the present invention. Data transmitter 101 is coupled to data receivers 102-104 by two signal lines, labelled "true data" and "complement data". The data receivers 102-104 may also transmit return data signals to the data transmitter by means of a shared signal line, labelled "return data", as shown for data receivers 103 and 104 or by means of a separate signal line as for data receiver 102. The return data signals transmitted by the data receivers 102-104 on the return data signal line are transmitted in synchronism with the data signals received from the data transmitter 101 on the true data and complement data signal lines. The data transmitter 101 and data receivers 102-104 may be in close proximity with one another or may be separated by great distances because the data transmission is self-clocking and is independent of the transmitting frequency. In the aforementioned related patent application, the data transmitter 101 is a microprocessor and the data receivers 102-104 are interface adapters in the control circuitry of a portable radiotelephone.

According to the present invention, data is transmitted by the data transmitter 101 to the data receivers 102-104 by making use of the four two-bit binary states that can be assumed by the true data and complement data signal lines taken together. For example, referring to state diagram of FIG. 4, a first two-bit binary state may be referred to as a "word state" 401, where the true data signal line has a binary one state and the complement data signal line has a binary one state. When no data is being transmitted, the word state 401 is provided on the true data and complement data signal lines. When a data signal is to be transmitted, a transition is made from the word state 401 to the zero state 402, represented as binary state 01, or to the one state 404, represented as the binary state 10, where the complement data signal line has a binary one state for binary zero bits of the data signal and the true data signal line has a binary one state for binary one bits of the data signal. For all succeeding bits of the data signal to be transmitted, a transition is first made to the bit state 403, represented by the binary state 00, before a transition to the one state 404 or zero state 402. The two-bit binary states of the true data and complement data signal lines are set forth hereinbelow in Table I.

TABLE I

| TRUE DATA | COMPLEMENT DATA | TWO-BIT STATE |
|---|---|---|
| 1 | 1 | Word State |
| 0 | 1 | Zero State |
| 1 | 0 | One State |
| 0 | 0 | Bit State |

Furthermore, transitions between the states 401-404 in FIG. 4 are selected so that only one signal line is changing binary state at a time. Transitions between the word state 401 and bit state 403 and between the one state 404 and zero state 402 are not allowed since they would require that the state of both the true data and complement data signal lines change simultaneously. By limiting transitions between the binary states 401-404 to those where only one of the signal lines is changing binary state at a time, the effects of skewing and timing variations are minimized. Moreover, by transmitting data signals as illustrated by the state diagram in FIG. 4, the transmission on the true data and complement data signal lines is both self-clocking and independent of the transmitting frequency. The time duration between each of the state transitions illustrated in FIG. 4 need not be the same and may vary dynamically. Thus, according to the data transmission scheme of the present invention, the frequency of the data transmission may be entirely asynchronous with randomly varying time intervals between successive state transitions.

Figure 5:
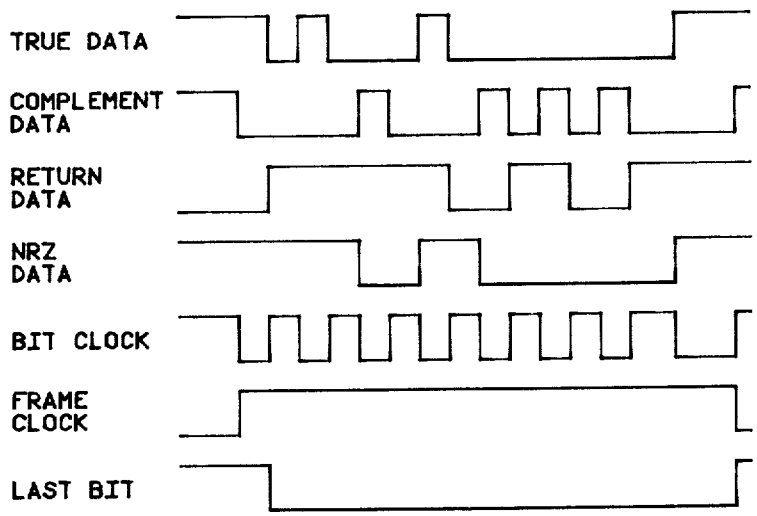
- FIG. 5 is a timing diagram illustrating the wave forms for various blocks of the data receiver in FIG. 3.

To summarize the transmission sequence, the true data and complement data signal lines have the word state 401 when no data is being transmitted (see waveforms in FIG. 5). For transmission of a data signal, two state transitions occur for each bit. For the first bit of the data signal, a transition is made from the word state 401 to the one state 404 or zero state 402, depending on the binary state of the bit to be transmitted. Next, a state transition is made to the bit state 403. Then, for each succeeding bit of the data signal, a transition is made to the one state 404 or the zero state 402 and then back to the bit state 403. Since a transition is made to the bit state 403 for each bit of the data signal to be transmitted, the bit state 403 can be utilized at the data receivers to generate a clock signal. For the last bit of the data signal, the last state transition is made from the one state 404 or zero state 402 back to the word state 401. Returning to the word state 401, after the last bit of the data signal has been transmitted indicates to the data receivers 102-104 that a complete data signal has been transmitted.

In order to provide for the bidirectional transmission of data signals between the data transmitter 101 and the data receivers 102-104 in FIG. 1, another signal line, referred to as the return data signal line, may be provided for carrying non-return-to-zero (NRZ) coded data signals from the data receivers 102-104. The data receivers 102-104 can transmit a return data signal on the return data signal line by utilizing the clock signal developed by detecting the bit state of the true data and complement data signal lines. In order to accommodate the transmission of return data signals, separate return data signal lines can be provided to each data receiver, as for data receiver 102, or a number of data receivers, such as data receivers 103-104, can be connected to one return data signal line. If a number of data receivers are connected to the same return data signal line, it will be necessary to selectively address the particular data receiver that is to transmit a return data signal. Many different addressing schemes can be utilized, such as, for example, utilizing a portion of the data signal transmitted by the data transmitter to provide an address, or transmitting separate address signals and data signals.

Referring to FIG. 2, there is illustrated a block diagram of data transmitter 101 in FIG. 1. When it is desired to transmit data, a data strobe pulse (a momentary binary one state) is applied to the strobe input of latch 201 for loading a new set of input data, which here is represented as an eight-bit binary signal. Latch 201 is transparent during data strobe pulse, and is otherwise latched. The data strobe signal via inverting gate 202 also clocks the Q output of flip-flop 208 to a binary one state, which corresponds to a +V voltage level with respect to ground. The binary one state of the Q output of flip-flop 208 is coupled via OR gate 204 to produce a binary one state of the busy signal, indicating that the data transmitter is presently busy transmitting a data signal.

The shift clock signal coupled to the clock inputs of flip-flop 209 and registers 203 and 211 determines the rate at which data is transmitted on the true data and complement data signal lines to the data receivers. The shift clock signal may be provided by a clock oscillator or by a remote device, such as a microcomputer. According to the present invention, the shift clock signal need not be periodic and may vary dynamically in frequency over time and from transition to transition.

Once flip-flop 208 has been clocked by the data strobe signal, the Q output of flip-flop 209 is clocked to a binary one state at the next positive transition of the shift clock signal. The Q output from flip-flop 209 is coupled to the parallel/shift input of register 203 and to the D input of register 211. Thus, at the next positive transition of the shift clock signal, register 203 is parallel loaded with the data signal from latch 201 and the first stage of shift register 211 is loaded with a binary one. The binary one state of the Q output of flip-flop 209 is also used to reset flip-flop 208, maintain the busy signal at a binary one state via OR gates 205 and 204, and apply the shift clock signal to register 203 via OR gate 205, inverting gate 206 and OR gate 207.

For the next eight cycle intervals of the shift clock signal, the data signal in register 203 is shifted right applying each bit in succession to inverting gate 216 and AND gate 219, while at the same time a binary one bit is shifted from stage to stage in shift register 211. The outputs of shift register 211 are combined via OR gate 212 for enabling AND gate 214 and for maintaining a binary one state of the busy signal via OR gates 205 and 204.

Prior to transmission of the data signal loaded into latch 201, the true data and complement data signal lines were maintained at a binary one state by OR gate 212 via OR gate 218 and inverting gate 215. When OR gate 218 changes state from a binary zero state to a binary one state, the state of the true data and complement data signal lines will be determined by each bit of the data signal in register 203. During the binary one interval of the first shift clock signal, the true data and complement data signal lines are maintained at a binary one state by AND gate 213. Next, during each succeeding binary zero interval of the shift clock signal, AND gates 217 and 219 are enabled to apply successive bits of the data signal from register 203 to OR gates 220 and 221 for the complement data and true data signal lines, respectively. The true data signal lines will have a binary one state for those bits of the data signal that likewise have a binary one state, while the complement data signal line will have a binary one state for those bits of the data signal which have a binary zero state. Typical waveforms for the true data and complement data signal lines are illustrated by the waveforms in FIG. 5.

At the same time that a data signal is being transmitted on the complement data and true data signal lines, a return data signal may be received on the return data signal line, which is coupled to the D input of register 203. Register 203, which is initially parallel loaded with the input data signal from latch 201, serially receives the return data signal as it is shifted to transmit the input data signal. Once the last bit of the input data signal has been transmitted, OR gate 212 changes state from a binary one state to a binary zero state and disables via OR gate 205 and inverting gate 206 the shift clock signal to register 203. Also, when the transmission is complete, register 203 provides the return data signal received from a data receiver at its outputs.

Referring to FIG. 3, there is illustrated a detailed circuit diagram for data receiver 102-104 in FIG. 1. Waveforms corresponding to labelled blocks in FIG. 3 for a typical data signal transmission are illustrated in FIG. 4, where the transmitted data signal is 11010001 and the return data signal is 01110101. The data receiver in FIG. 3 includes a data latch formed by NAND gates 305 and 306, which is set by NAND gate 303, which detects the one state (see FIG. 4) of the true data and complement data signal lines, and is reset by NAND gate 304, which detects the zero state of the true data and complement data signal lines. Complements of the true data and complement data signal lines necessary for decoding the two-bit binary states thereon are provided by inverting gates 301 and 302. The output from data latch 305 and 306 is the recovered NRZ data signal and is coupled to the D input and high order parallel input of register 312.

The data receiver also includes a last bit latch formed by NAND gates 309 and 310. The last bit latch 390-310 is set by the bit state of the true data and complement data signal lines, as detected by NAND gate 307, and is reset by the word state of the true data and complement data signal lines, as detected by NAND gate 308. The last bit latch output signal is applied to NAND gate 314 and to the parallel/shift input of register 312.

A recovered bit clock signal is provided by NAND gate 311 in response to the bit state of the true data and complement data signal lines, as detected by NAND gate 307. The bit clock signal is also forced to a binary one state by the word state of the true data and complement data signal lines, as detected by NAND gate 308.

When a data signal is transmitted to the data receiver in FIG. 3, register 312 is initially parallel loaded in response to the last bit latch output signal and thereafter serially clocked in response to each positive transition of the bit clock signal for shifting in the recovered NRZ data signal. Since the data signals in the preferred embodiment have eight bits, register 312 and latch 31 have eight stages. When eight bits of the recovered NRZ data signal have been shifted into register 312, the frame clock signal provided by NAND gate 308 changes state from a binary one state to a binary zero state causing latch 313 to be transparent, coupling the received NRZ data signal from register 312 to its output. While register 312 was shifting, latch 313 was held in the latched state by the binary one state of the frame clock signal. Also, the return data signal loaded into register 312 is serially applied by NAND gates 314-316 to the return data signal line while the transmitted data signal is being received.

The data receiver of FIG. 3 requires a separate return data signal line for each additional data receiver included in the data transmission system. In order to couple a number of data receivers to the same return data signal line, it is necessary to provide capability for selectively addressing each data receiver. One way to provide for selectively addressing a number of data receivers is to transmit an address signal before the data signal. Many different transmission formats providing for an address signal prior to the data signal can be realized utilizing the data transmission scheme of the present invention. For example, the address signal and data signal may be separated by the word state of the true data and complement data signal lines if the data transmission scheme in FIG. 4 is used. According to another scheme, the address signal and data signal may be differentiated by providing the word state of the true data and complement data signal lines between each bit of the address signal and the bit state between each bit of the data signal. By utilizing this scheme, variable length addresses may be defined while maintaining fixed length data words. The end of the address signal is identified by the bit state of the true data and complement data signal lines occurring after the first bit of the following data signal. A data receiver which receives an eight-bit address signal followed by an eight-bit data signal transmitted according to this scheme is illustrated in FIG. 6.

Referring to FIG. 6, the data receiver illustrated there is essentially identical to the data receiver of FIG. 3, with the exception of the additional address register 320, address decoder 321 and gates 322-325. Waveforms corresponding to labelled blocks in FIG. 6 for a typical address and data signal transmission are illustrated in FIG. 7, where the transmitted address signal is 01010101, the transmitted data signal is 11010001, and the return data signal is 01110101. In FIG. 6, address register 320 serially receives the NRZ data signal from data latch 305-306 in response to the word state of the true data and complement data signal lines, as detected by NAND gate 308 and inverting gate 322. Since the word state is provided between each bit of the address signal, NAND gate 308 and inverting gate 322 provide clock pulses in response to the detected word state. The eight-bit address signal received by address register 320 is decoded by address decoder 21 and enables NAND gate 323 if the correct address for this receiver has been received and decoded. The data signal following the address signal is then serially shifted into register 312 as described with reference to FIG. 3. A return data signal previously parallel loaded into register 312 is serially applied by way of inverting gate 324 to NAND gate 315 which also is enabled by address decoder 321 if the correct address has been received and decoded. The return data signal is coupled from NAND gate 315 by way of NAND gate 316 is open collector inverting gate 325 for application to the shared return data signal line. The open-collector inverting gate 325 is disabled until the address signal is detected by the decoder 321 which then enables NAND gate 315. Since a number of different data receivers are coupled to the return data signal line, an open collector inverting gate 325 is utilized to interface each data receiver to the return data signal line. Any other suitable tri-state busing devices could also be utilized for interfacing the data receivers to the return data signal line.

When all eight bits of the transmitted data signal have been serially shifted into register 312, NAND gate 323, having been enabled by address decoder 321, clocks the received data signal from register 312 into register 326 in response to the output from last bit latch 309, 310.

According to another feature of the present invention, the data receiver in FIG. 6 may alert the data transmitter that a return data signal is available by putting a momentary interrupt signal on the return data signal line. In FIG. 6, NAND gate 314 in enabled to couple the interrupt signal to the return data signal line by an output of the last bit latch 309, 310. The output of the last bit latch 309, 310 disables NAND gate 314 only during transmission of the return data signal. Thus, an interrupt signal can be coupled to the return data signal line by any receiver at any time except during the time interval during which a selected data receiver is transmitting a return data signal. Since the data transmitter has no way of telling which data receiver generated the interrupt signal, the data transmitter will have to poll all data receivers after receiving the interrupt signal.

The data transmitter in FIG. 2 and the data receivers in FIGS. 3 and 6 can be constructed of conventional integrated circuit devices, such as the CMOS devices described in the CMOS Integrated Circuits Book, published by Motorola Semiconductor Products, Inc., Austin, Tex., 1978. Furthermore, the electrical circuit devices comprising the data transmitter in FIG. 2 and the data receiver in FIGS. 3 and 6 can be readily integrated into a semiconductive substrate such that a data transmitter and data receiver can be separately, or both, provided in a single integrated circuit device.

The data transmission scheme of the present invention can be advantageously utilized in many different data transmission systems. For example, the inventive data transmission scheme can be used to communicate data between a microprocessor and peripheral devices such as auxiliary memories, keyboards, displays and radio units as described in the aforementioned co-pending applications. Likewise, the inventive data transmission scheme can be used to control a plurality of radio transmitters located in geographically separated remote stations from a central control station. Delays and skewing due to long distances are not critical to proper transmission since the data transmission scheme is self-clocking and independent of speed and timing variations.

In summary, the data transmission scheme and apparatus of the present invention provide for reliable, self-clocking, bidirectional data transmission that is highly immune to speed and timing variations. By utilizing two bit binary states of the true data and complement data signal lines taken together, the inventive data transmission scheme is capable of uniquely defining the beginning and end of a data signal and the binary states of the bits of a data signal, while also differentiating between address and data signals. The exact two-bit binary states selected can be varied as long as only one signal line changes binary state for each state transition, as illustrated in FIG. 4.

I claim:

1. A method of serially transmitting a data signal from a signal source by means of first and second binary signals, the data signal including a plurality of bits each having a binary zero state or a binary one state, said method comprising the steps of:
    (a) generating a first binary state of the first and second signals before and after the data signal;
    (b) generating for each bit of the data signal a second binary state of the first signal and the first binary state of the second signal for a bit having a binary zero state, and generating the first binary state of the first signal and the second binary state of the second signal for a bit having a binary one state; and
    (c) generating the second binary state of the first and second signals between successive bits of the data signal.

2. The method according to claim 1, further including the step of repeating steps (b) and (c) for transmitting subsequent data signals.

3. The method according to claim 1, further including the step of generating a clock signal having a dynamically varying frequency, said step (b) generating the respective binary states of the first and second signals for each bit of the data signal in response to the clock signal.

4. The method according to claim 1, further including the step of generating a clock signal having a frequency varying over a predetermined range of frequencies, said step (b) generating the respective binary states of the first and second signals for each bit of the data signal in response to the clock signal.

5. The method according to claim 1, further including the step of generating a clock signal having a predetermined frequency, said step (b) generating the respective binary states of the first and second signals for each bit of the data signal in response to the clock signal.

6. A method of serially transmitting an address signal and a data signal from a signal source by means of first and second binary signals, the address signal and data signal each including a plurality of bits having a binary zero state or a binary one state, said method comprising the steps of:

(a) generating a first binary state of the first and second signals before the first bit of the address signal and after the last bit of the data signal;

(b) generating for each bit of the address signal a second binary state of the first signal and the first binary state of the second signal followed by the first binary state of the first and second signals for a bit having a binary zero state, and generating the first binary state of the first signal and the second binary state of the second signal followed by the first binary state of the first and second signals for a bit having a binary one state;

(c) generating for each bit of the data signal the second binary state of the first signal and the first binary state of the second signal for a bit having a binary zero state, and generating the first binary state of the first signal and the second binary state of the second signal for a bit having a binary one state; and (d) generating the second binary state of the first and second signals between successive bits of the data signal.

7. The method according to claim 6, further including the step of repeating steps (d) and (e) for transmitting subsequent data signals.

8. The method according to claim 6, further including the step of generating a clock signal having a dynamically varying frequency, said steps (b) and (d) generating the respective binary states of the first and second signals for each bit in response to the clock signal.

9. The method according to claim 6, further including the step of generating a clock signal having a frequency varying over a predetermined range of frequencies, said steps (b) and (d) generating the respective binary state of the first and second signals for each bit in response to the clock signal.

10. The method according to claim 6, further including the step of generating a clock signal having a predetermined frequency, said steps (b) and (d) generating the respective binary states of the first and second signals for each bit in response to the clock signal.

11. Apparatus for serially transmitting a data signal from a signal source by means of first and second binary signals, the data signal including a plurality of bits each having a binary zero state or a binary one state, said apparatus comprising:

first means for generating a first binary state of the first and second signals before and after the data signal;

second means for generating for each bit of the data signal a second binary state of the first signal and the first binary state of the second signal for a bit having a binary zero state, and generating a first binary state of the first signal and the second binary state of the second signal for a bit having a binary one state; and said second means generating the second binary state of the first and second signals between successive bits of the data signal.

12. The data transmitting apparatus according to claim 11, further including means for generating a clock signal, said second generating means generating the respective binary states of the first and second signals for each bit of the data signal in response to the clock signal.

13. The data transmitting apparatus according to claim 12, further including means for providing a strobe signal and means responsive to the strobe signal for storing a data signal, said second generating means responsive to the data signal stored in the storing means for generating the respective states of the first and second signals.

14. Apparatus for receiving a data signal from first and second binary signals serially transmitted by a signal source, the data signal including a plurality of bits each having a binary zero state or a binary one state, the first and second signals having a first binary state before and after the data signal, the first signal having a second binary state and the second signal having a first binary state for data signal bits having a binary zero state, the first signal having a first binary state and the second signal having a binary state for data signal bits having a binary one state, and the first and second signals having a second binary state between successive data signal bits, said receiving apparatus comprising:

first means responsive to the second binary state of the first and second signals for generating a clock signal;

second means coupled to the first and second signals for storing an output signal having a binary zero state in response to a second binary state of the first signal and a first binary state of the second signal, and storing an output signal having a binary one state in response to a first binary state of the first signal and a second binary state of the second signal; and third means coupled to the first means and second means for storing the second means output signal in response to the clock signal.

15. The data receiving apparatus according to claim 14, further including a signal source for providing a return data signal having a plurality of binary bits, and means responsive to the clock signal for generating for successive bits of the return data signal a corresponding binary state of a return signal.

16. The data receiving apparatus according to claim 15, further including means for generating a pulsed binary state of the return signal line to indicate that a return data signal is available for transmission.

17. A system for serially communicating data signals, each including a plurality of bits each having a binary zero state or a binary one state, between a transmitting unit and at least one receiving unit intercoupled by first and second binary signals, said system comprising:
- a transmitting unit for transmitting a data signal, including:
  - a signal source for providing a data signal;
  - first means for generating a first binary state of the first and second signals before and after the data signal;
  - second means for generating for each bit of the data signal a second binary state of the first signal and a first binary state of the second signal for a bit having a binary zero state, and the first binary state of the first signal and a second binary state of the second signal for a bit having a binary one state; and
  - said second means generating the second binary state of the first and second signals between successive bits of the data signal; and
- a receiving unit for receiving a data signal transmitted by the transmitting unit, including:
  - third means responsive to the second state of the first and second signals for generating a clock signal;
  - fourth means coupled to the first and second signals for storing an output signal having a binary zero state in response to a second binary state of the first signal and a first binary state of the second signal, and a binary one state in response to a first binary state of the first signal and a second binary state of the second signal; and
  - fifth means coupled to the third means and fourth means for storing successive binary states of the fourth means output signal in response to the third means clock signal.

18. The data communication system according to claim 17, wherein said transmitting unit further includes sixth means for generating a clock signal, said second means generating the respective binary states of the first and second signals for each bit in response to the clock signal.

19. The data communication system according to claim 18 further including a binary return signal between the transmitting unit and receiving unit, said receiving unit further including a signal source for providing a return data signal having a plurality of binary bits, and seventh means responsive to the third means clock signal for generating for successive bits of the return data signal a corresponding binary state of the return signal, and the transmitting unit further including eighth means coupled to the return signal for storing in response to the sixth means clock signal successive binary states of the return signal.

20. The data communication system according to claim 19, wherein said receiving unit further includes nineth means for generating a pulsed binary state of the return signal to indicate that a return data signal is available for transmission, said transmitting unit including tenth means coupled to the return signal for detecting said pulsed binary state and enabling the transmitting unit to transmit a data signal.

21. The data communication system according to claim 19 or 20, including a plurality of said receiving units each coupled to the first and second signals and the return signal.

* * * * *